United States Patent
White et al.

(10) Patent No.: US 12,296,939 B2
(45) Date of Patent: *May 13, 2025

(54) UNMANNED AIRSHIPS, AEROSTATS, AND HYBRID AIRSHIP-AEROSTAT SYSTEMS AND METHODS THEREOF

(71) Applicant: Galaxy Unmanned Systems LLC, Arlington, TX (US)

(72) Inventors: Antonio Roberto White, Bedford, TX (US); Jason Theodore White, Arlington, TX (US)

(73) Assignee: Galaxy Unmanned Systems LLC, Arlington, TX (US)

( * ) Notice: Subject to any disclaimer, the term of this patent is extended or adjusted under 35 U.S.C. 154(b) by 46 days.

This patent is subject to a terminal disclaimer.

(21) Appl. No.: 18/198,931

(22) Filed: May 18, 2023

(65) Prior Publication Data
US 2023/0286636 A1  Sep. 14, 2023

Related U.S. Application Data

(63) Continuation of application No. 17/477,052, filed on Sep. 16, 2021, now Pat. No. 11,685,500.
(Continued)

(51) Int. Cl.
*B64B 1/66* (2006.01)
*B64B 1/20* (2006.01)
(Continued)

(52) U.S. Cl.
CPC ............... *B64B 1/20* (2013.01); *B64B 1/22* (2013.01); *B64B 1/30* (2013.01); *B64B 1/58* (2013.01); *B64B 1/66* (2013.01); *B64B 2201/00* (2013.01)

(58) Field of Classification Search
CPC ......... B64B 2201/00; B64B 1/20; B64B 1/22; B64B 1/30; B64B 1/58; B64B 1/66
See application file for complete search history.

(56) References Cited

U.S. PATENT DOCUMENTS

| 5,143,323 | A | * | 9/1992 | Husain | ...................... B64F 1/14 244/116 |
| 6,010,093 | A | * | 1/2000 | Paulson | .................. G01W 1/08 244/30 |

(Continued)

FOREIGN PATENT DOCUMENTS

| CN | 106741819 A | 5/2017 |
| CN | 109693806 A | 4/2019 |

(Continued)

OTHER PUBLICATIONS

International Search Report dated Jan. 4, 2022 for corresponding International Appliclation No. PCT/US2021/050700 (15 pages).
(Continued)

*Primary Examiner* — Tye William Abell
(74) *Attorney, Agent, or Firm* — CARTER, DELUCA & FARRELL LLP; George Likourezos, Esq.

(57) ABSTRACT

A hybrid airship-aerostat includes a hull, a motor, a fin, a controller, and a bridle system. The motor is coupled to the hull and is configured to rotate between a thrust configuration and a lift configuration. The motor is configured to generate a lift force, a thrust force, or a combination thereof.

(Continued)

The fin is coupled to a tail of the hull and is configured to provide directional control of the hull. The controller is configured to operate the motor and the fin to pilot the hull. The bridle system is configured to removably couple to a first end of a tether.

20 Claims, 10 Drawing Sheets

Related U.S. Application Data (60) Provisional application No. 63/122,210, filed on Dec. 7, 2020, provisional application No. 63/114,794, filed on Nov. 17, 2020, provisional application No. 63/079,158, filed on Sep. 16, 2020, provisional application No. 63/079,103, filed on Sep. 16, 2020, provisional application No. 63/079,167, filed on Sep. 16, 2020, provisional application No. 63/079,171, filed on Sep. 16, 2020, provisional application No. 63/079,177, filed on Sep. 16, 2020.

(51) Int. Cl.
  *B64B 1/22* (2006.01)
  *B64B 1/30* (2006.01)
  *B64B 1/58* (2006.01)

(56) References Cited

U.S. PATENT DOCUMENTS

| | | | |
|---|---|---|---|
| 7,334,757 B2* | 2/2008 | Steinkerchner | B64B 1/66 244/115 |
| 8,485,465 B2* | 7/2013 | Lee | B64B 1/50 244/33 |
| 2005/0156082 A1* | 7/2005 | Eberle | B64B 1/58 244/96 |
| 2018/0050785 A1* | 2/2018 | Goelet | B64B 1/34 |
| 2018/0297684 A1* | 10/2018 | Nikolic | B64B 1/06 |
| 2020/0108903 A1* | 4/2020 | Lee | B64F 3/02 |

FOREIGN PATENT DOCUMENTS

| | | |
|---|---|---|
| GB | 191312572 A | 7/1913 |
| GB | 191323152 A | 12/1913 |
| WO | 8800906 A1 | 2/1988 |

OTHER PUBLICATIONS

International Preliminary Report on Patentability issued by the International Bureau of WIPO in connection with International Application No. PCT/US2021/050700, dated Mar. 21, 2023.

* cited by examiner

UNMANNED AIRSHIPS, AEROSTATS, AND HYBRID AIRSHIP-AEROSTAT SYSTEMS AND METHODS THEREOF

CROSS-REFERENCE TO RELATED APPLICATIONS

This application is a continuation of U.S. patent application Ser. No. 17/477,052, filed on Sep. 16, 2021, which claims the benefit of, and priority to, U.S. Provisional Patent Application No. 63/079,158, filed on Sep. 16, 2020, entitled "AIRSHIP/AEROSTAT HYBRID VEHICLE," the benefit of, and priority to, U.S. Provisional Patent Application No. 63/079,103, filed on Sep. 16, 2020, entitled "UNMANNED AIRSHIP DRONE CARRIER," the benefit of, and priority to, U.S. Provisional Patent Application No. 63/079,167, filed on Sep. 16, 2020, entitled "UNMANNED AIRSHIP SYSTEMS HAVING MOBILE HANGER WITH PORTABLE GANTRY;" the benefit of, and priority to, U.S. Provisional Patent Application No. 63/079,171, filed on Sep. 16, 2020, entitled "NON-RENEWABLE HELIUM RECYCLING SYSTEMS AND METHODS FOR AEROSTATS, AIRSHIPS AND OTHER LIGHTER-THAN-AIR (LTA) VEHICLES," the benefit of, and priority to, U.S. Provisional Patent Application No. 63/079,177, filed on Sep. 16, 2020, entitled "LTA HYBRID ELECTRIC ORB FOR URBAN MOBILITY," the benefit of, and priority to, U.S. Provisional Patent Application No. 63/114,794, filed on Nov. 17, 2020, entitled "LTA HYBRID SOLAR FUEL CELL LONG DURATION AERIAL PLATFORM," and, the benefit of, and priority to, U.S. Provisional Patent Application No. 63/122,210, filed on Dec. 7, 2020, entitled "INNOVATIVE WING DESIGN," the entire contents of each of which are incorporated herein by reference.

TECHNICAL FIELD

This disclosure relates to airships, aerostats, and lighter than air vehicles, and specifically, relates to a hybrid airship-aerostat and methods for automatically piloting a lighter than air vehicle.

BACKGROUND

Standard airships, blimps, and similar free-flying lighter-than-air aircraft have limited duration flight missions to either a maximum amount of fuel it can carry. In contrast, aerostats are capable of much longer flight missions but are tethered to a ground station. Airships and aerostats, due to their different uses, also typically have different cross-section shapes, varying types of fins (where aerostats typically have still fins and airships may have an actuatable fin), and different payloads. While both aerostats and airships utilize a gas that is lighter than air to generate lift and become buoyant, neither is well suited to operate as the other. Additionally, flight controls are different for airships and aerostats due to their varying flight needs.

SUMMARY

This disclosure provides a hybrid airship-aerostat that includes a hull, a motor, a fin, a controller, and a bridle system. The motor is coupled to the hull and is configured to rotate between a thrust configuration and a lift configuration. The motor is configured to generate a lift force, a thrust force, or a combination thereof. The fin is coupled to a tail of the hull and is configured to provide directional control of the hull. The controller is configured to operate the motor and the fin to pilot the hull. The bridle system is configured to removably couple to a first end of a tether.

In aspects, the hull may be transitionable between an airship configuration and an aerostat configuration, such that, when the bridle system is not coupled to the tether the hull is in the airship configuration and when the bridle system is coupled to the tether the hull is in the aerostat configuration.

In aspects, the hybrid airship-aerostat may further include a sensor configured to determine at least one of a flight parameter or a meteorological condition, the sensor being in wired communication or wireless communication with the controller.

In aspects, the controller may be configured to operate the motor and the fin to pilot the hull based on the flight parameter or meteorological condition determined by the sensor.

In aspects, the hybrid airship-aerostat may further include a gondola removably coupled to the hull.

In aspects, the hybrid airship-aerostat may further include a surveillance system removably coupled to the hull.

In aspects, the surveillance system may include at least one of a camera or a radar.

In aspects, the controller may be configured to operate the motor and the fin to pilot the hull towards a mooring platform, the mooring platform being coupled to a second end of the tether.

In aspects, the controller may be configured to operate the fin to control at least one of a yaw, a pitch, or a roll of the hull. The controller may be configured to cause the motor to rotate between the thrust configuration and the lift configuration and cause the motor to generate the lift force, the thrust force, or any combination thereof.

In aspects, the motor is operable in an intermediate position wherein the motor generates both the lift force and the thrust force.

In aspects, the hybrid airship-aerostat may further include at least one ballonet and a lighter-than-air gas pumping system. The controller is configured to inflate or deflate the ballonet to adjust an angle of attack of the hull. The lighter-than-air gas pumping system is configured to add or remove a lighter-than-air gas to the hull to change a buoyancy of the hull.

This disclosure also provides a lighter-than-air vehicle transitionable between an aerostat configuration and an airship configuration. The lighter-than-air vehicle includes a hull having a plurality of fins extending from an aft portion of the hull, each fin actuatable to control at least one of a yaw, a pitch, or a roll of the hull. The hull also has a plurality of motors including a first motor and a second motor. The first motor is rotatably coupled to a first side of the hull and the second motor is rotatably coupled to a second side of the hull. A sensor is configured to determine at least one of a flight parameter or a meteorological condition. A controller is configured to operate the plurality of motors and actuate the plurality of fins based on the at least one of the flight parameter or the meteorological condition. A tether is removably coupled to the hull at a first end of the tether, the tether configured to provide electrical power to at least one of the plurality of motors, the sensor, or the plurality of fins.

In aspects, the lighter-than-air vehicle may include a surveillance system coupled to the hull, the surveillance system configured to obtain at least one of an image, a video, or a direction and a location of an aerial object.

In aspects, when the lighter-than-air vehicle is in the aerostat configuration, the tether may be coupled to the hull, and when the lighter-than-air vehicle is in the airship configuration the tether may not be coupled to the hull.

In aspects, the controller may include a processor and a memory having instructions stored thereon. The instructions, when executed by the processor, may cause the lighter-than-air vehicle to: determine, via the sensor, at least one of the flight parameter or the meteorological condition; or pilot the hull based on the at least one of the flight parameter or the meteorological condition. The piloting of the hull may include at least one of: maintaining an orientation, position, or altitude of the hull; determining a new orientation, new position, or new altitude and steering the hull to the new orientation, the new position, or the new altitude; navigating to avoid the meteorological condition or an aerial object; or descending and performing a docking procedure.

In aspects, the flight parameter may include at least one of a position, an orientation, an altitude, or a velocity of the hull.

In aspects, the meteorological condition may include at least one of: a wind speed, a wind direction, a density of air, an inclement weather condition, a cloud cover condition, or an air pressure.

In aspects, the lighter-than-air vehicle may include a mooring platform coupled to a second end of the tether, the mooring platform configured to receive the hull. The mooring platform may include: a bed pivotably coupled to a trailer; a tower coupled to the bed; a receiving cone configured to slide along the tower and configured to receive a nose of the hull; and a pair of retaining arms configured to pivot between an open position and a grasping position, the pair of retaining arms configured to engage the hull in the grasping position.

In aspects, the controller may include a processor and a memory with instructions stored thereon. The instructions, when executed by the processor, are configured to cause the hull to: orient the mooring platform to align with the hull; steer the hull, via at least one of the plurality of motors or the plurality of fins towards the mooring platform; position a nose of the hull and maneuver the nose of the hull to be adjacent the receiving cone; capture the nose of the hull via the receiving cone; and engage, via the pair of retaining arms, the hull.

In aspects, the plurality of motors may include a third motor and a fourth motor, and the plurality of fins may include four fins arranged in an "X" configuration about the hull. The controller may be configured to control each motor to cause the hull to ascend, descend, or maintain an altitudinal position, move forward or rearward, turn, or any combination thereof. The controller may be further configured to actuate each fin to control at least one of a yaw, a pitch, or a roll of the hull.

In aspects, when the lighter-than-air vehicle is in the airship configuration, the hull may include a gondola, and when in the aerostat configuration, the tether may be coupled to a bridle system of the hull.

Other aspects, features, and advantages will be apparent from the description, the drawings, and the claims that follow.

BRIEF DESCRIPTION OF THE DRAWINGS

A better understanding of the features and advantages of the disclosed technology will be obtained by reference to the following detailed description that sets forth illustrative aspects, in which the principles of the technology are utilized, and the accompanying drawings of which.

DETAILED DESCRIPTION

Aspects of the presently disclosed unmanned airships, aerostats, and hybrid airship-aerostat systems and methods thereof are described in detail with reference to the drawings, in which like reference numerals designate identical or corresponding elements in each of the several views.

Although this disclosure will be described in terms of specific aspects, it will be readily apparent to those skilled in this art that various modifications, rearrangements, and substitutions may be made without departing from the spirit of this disclosure.

As used herein, the term "forward" refers to an upstream portion of a hybrid unmanned airship-aerostat (HUAA) vehicle (e.g., an airship, a blimp, an aerostat, a hybrid airship-aerostat, or similar lighter-than-air (LTA) aircraft with a body of gas that is lighter than air to assist in lift) and the term "aft" refers to a downstream portion of the HUAA vehicle. The term "hybrid" in HUAA refers to the combination of an airship, blimp, or dirigible and an aerostat or balloon.

As used herein, the terms "about," "approximately", or "near" mean that the numerical value is approximate and small variations would not significantly affect the practice of the disclosed aspects of this disclosure. Where a numerical limitation is used, unless indicated otherwise by the context, "about," "approximately", or "near" mean the numerical value can vary by ±15% and remain within the scope of the disclosed aspects of this disclosure.

Figure 1:
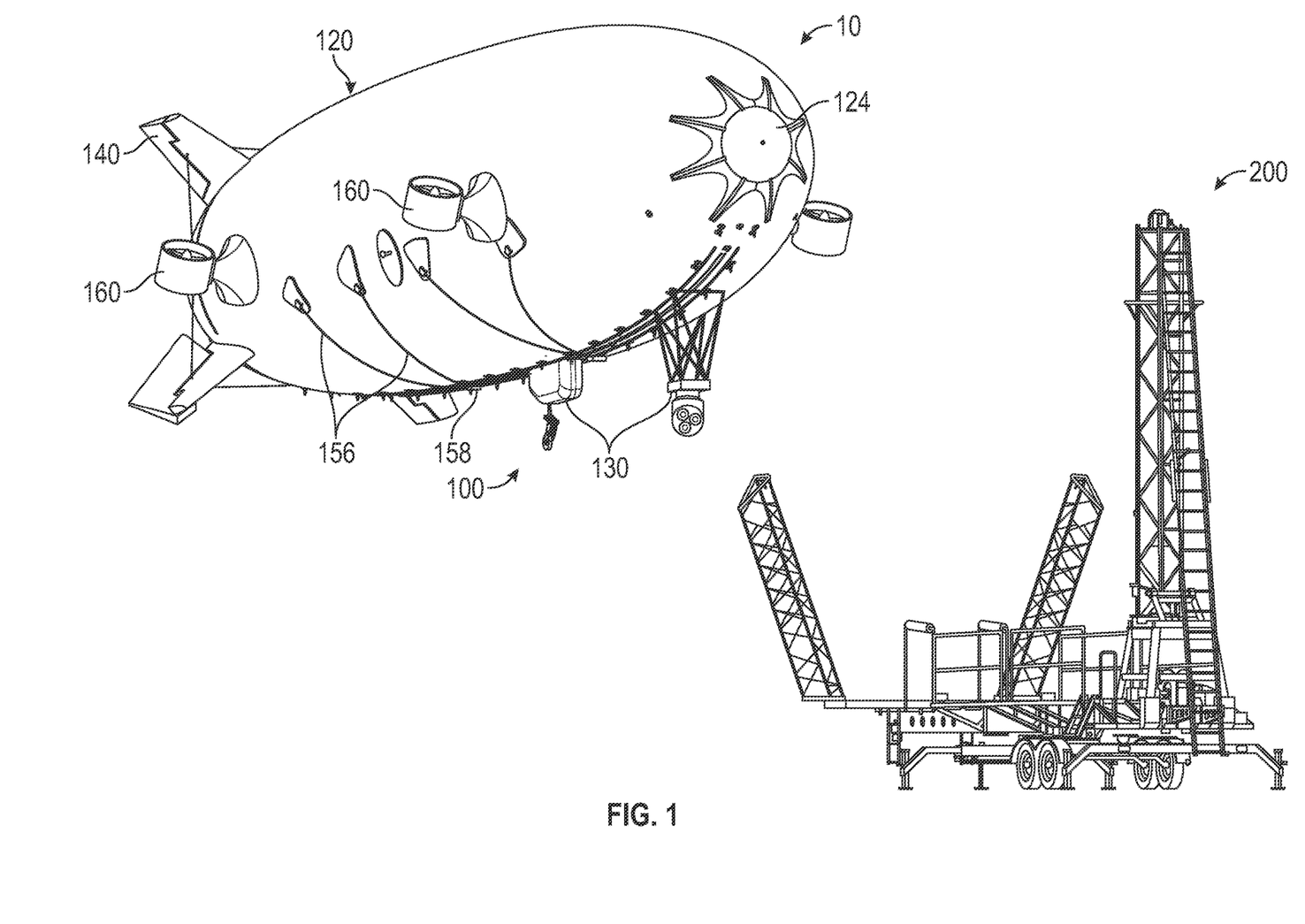
FIG. 1 is a front, perspective view of an unmanned hybrid airship-aerostat and mooring platform system.

With reference to FIG. 1, an unmanned hybrid airship-aerostat and mooring platform system 10 includes a HUAA vehicle 100 and a mooring platform 200. The HUAA vehicle 100 generally includes a hull 120, a fin 140, a motor 160. The HUAA vehicle 100 may include a payload 130. The payload 130 may be at least one of a surveillance system 134 or a gondola 132. The mooring platform 200, described in further detail below, is configured to receive the HUAA vehicle 100. The HUAA vehicle 100 includes a controller 110 configured to operate at least one of the fin 140 or the motor 160 to enable the HUAA vehicle 100 to semi-autonomously or fully autonomously pilot itself.

Figure 2:
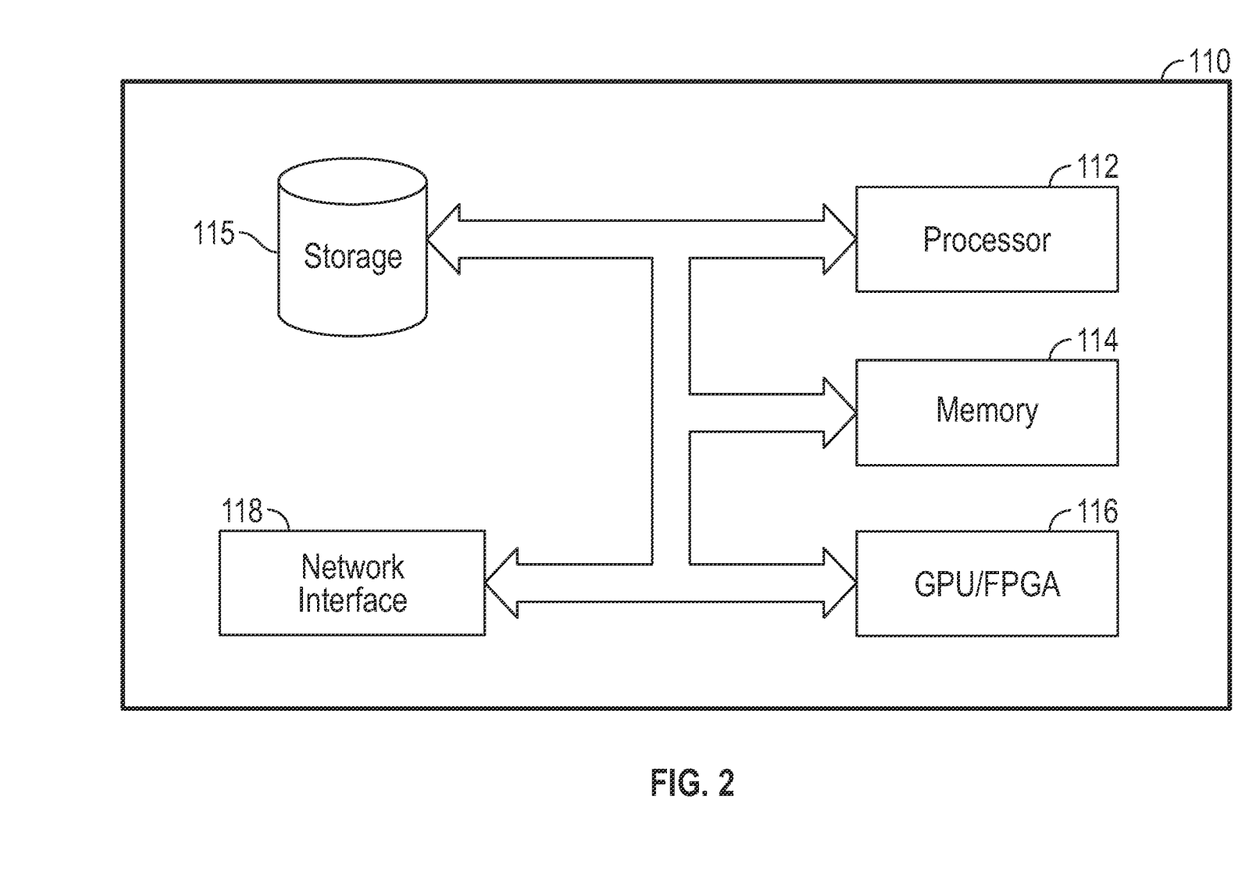
FIG. 2 is a block diagram of a controller of the system of FIG. 1.
Figure 3:
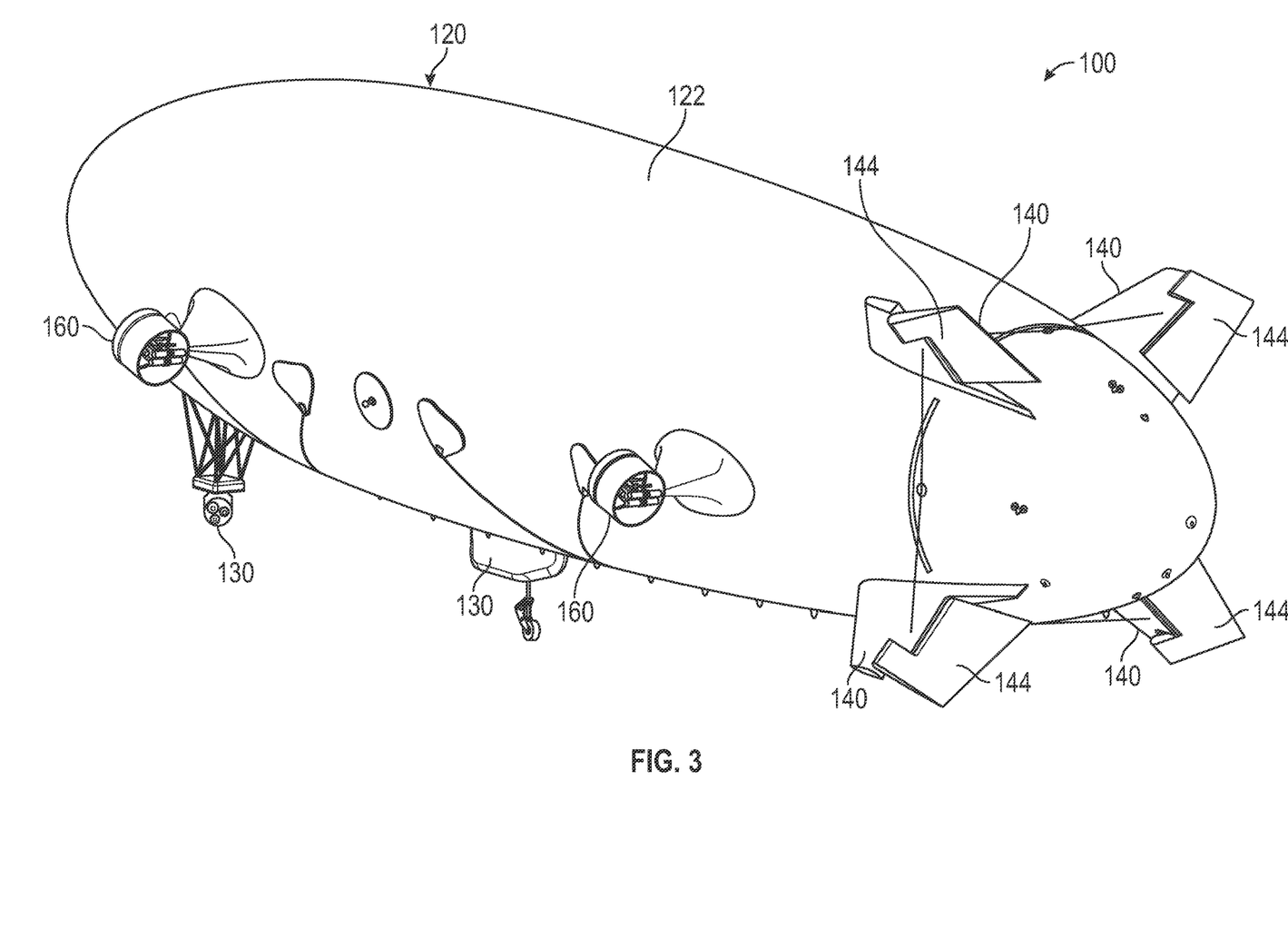
FIG. 3 is a rear, perspective view of the unmanned hybrid airship-aerostat of FIG. 1.
Figure 4A:
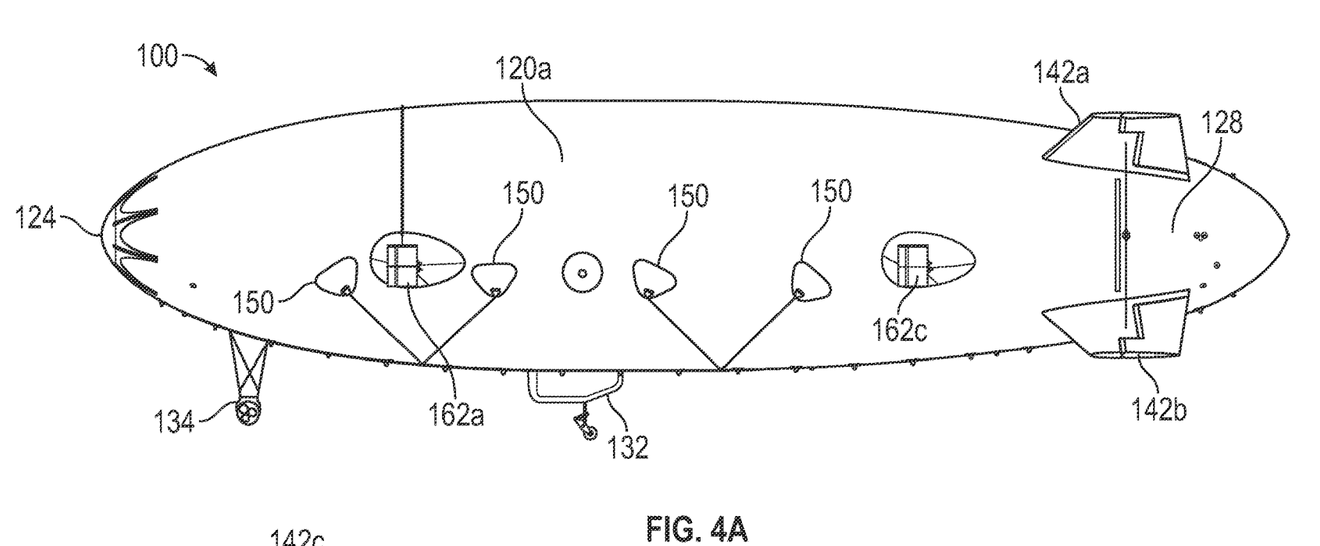
FIGS. 4A-4B are side views of the unmanned hybrid airship-aerostat of FIG. 1.
Figure 4B:
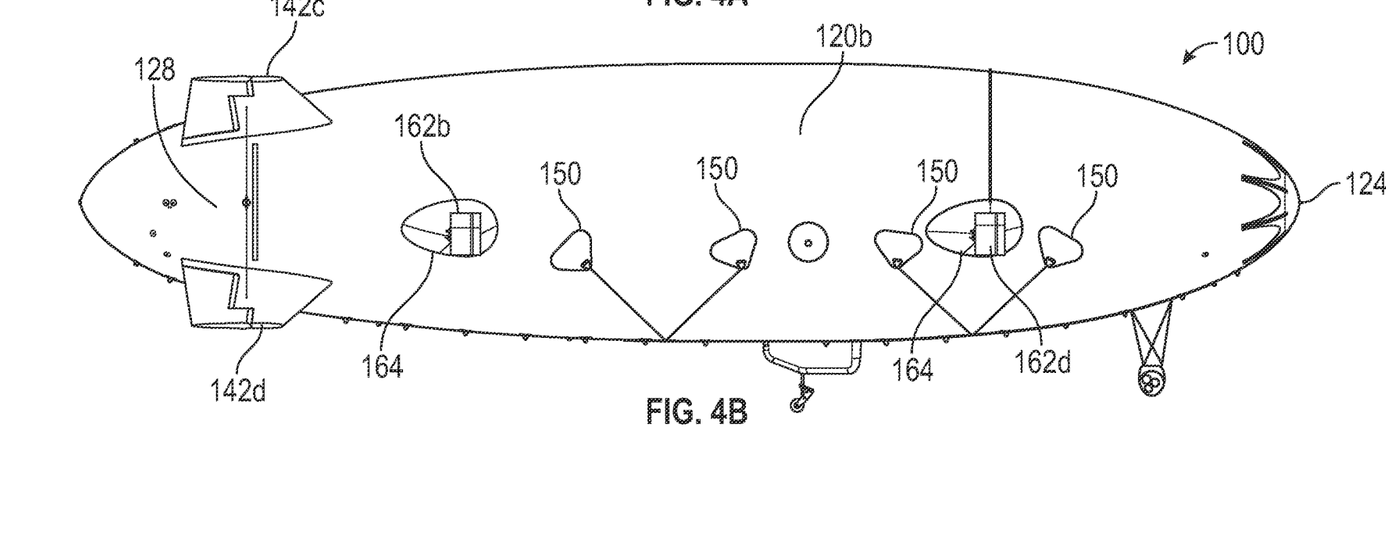

With reference to FIG. 2, the controller 110 includes a processor 112 that is connected to a computer-readable storage medium or a memory 114. The computer-readable storage medium or memory 114 may be a volatile type memory, e.g., RAM, or a non-volatile type memory, e.g., flash media, disk media, etc. In various aspects of the disclosure, the processor 112 may be any type of processor such as, without limitation, a digital signal processor, a microprocessor, an ASIC, a graphics processing unit (GPU), a field-programmable gate array (FPGA), or a central processing unit (CPU). In certain aspects of the disclosure, network inference may also be accomplished in systems that have weights implemented as memristors, chemically, or other inference calculations, as opposed to processors.

In aspects of the disclosure, the memory 114 can be random access memory, read-only memory, magnetic disk memory, solid-state memory, optical disc memory, and/or another type of memory (e.g., RAM, ROM, EEPROM, flash memory, or the like). In some aspects of the disclosure, the memory 114 can be separate from the controller 110 and can communicate with the processor 112 through communication buses of a circuit board and/or through communication cables such as serial ATA cables or other types of cables. The memory 114 includes computer-readable instructions that are executable by the processor 112 to operate the controller 110. The memory 114 may include volatile (e.g., RAM) and non-volatile storage configured to store data, including software instructions for operating the HUAA vehicle 100. In other aspects of the disclosure, the controller 110 may include a network interface 118 to communicate with other computers, controllers, or to a server. Network interface 118 may communicate with satellites and/or telecommunications systems. A database 115 and/or a storage device may be used for storing data.

With reference to FIGS. 1, 3, and 4A-4B, the HUAA vehicle 100 includes a hull 120 configured to house a gas that is lighter than air, such as helium or hydrogen gas. The hull 120 may be defined by an internal frame (not shown) to support an envelope 122 of the hull 120. The envelope 122 may be made of any suitable flexible, gas-impermeable (or approximately gas-impermeable) material such as polyvinyl chloride, coated nylon, and the like used for blimps, airships, and aerostats by those of ordinary skill in the art. The hull 120 is configured to house a sufficient amount of a lighter-than-air gas so as to be able to generate lift. The hull 120 may include one or more ballonets (not shown) disposed therein. The hull 120 includes a nose 124 at a forward portion of the hull 120 configured to enable the hull 120 to be received by the mooring platform 200 (described in further detail below).

The HUAA vehicle 100 may include a plurality of motors 160. The plurality of motors 160 may include a first motor 162a disposed a side 120a of the hull 120 a second motor 162b on another side 120b of the hull 120. In aspects, a third motor 162c may also be disposed on the side 120a of the hull 120 aft of the motor 162a and a fourth motor 162d may also be disposed on the side 120b of the hull 120 aft of the motor 162b. It is contemplated that each side 120a, 120b of the hull 120 may have any number of motors 160, such as 4 or 7 motors on each side. Each motor 162 (e.g., 162a, 162b, 162c, or 162d) of the plurality of motors 160 are each coupled to the hull 120 and configured to individually and selectively rotate between a thrust configuration and a lift configuration. Each motor 162 of the plurality of motors 160 is coupled to the hull 120 via an aerodynamic pivot joint 164 that enables each motor to rotate between the thrust and lift configurations. The aerodynamic pivot joint 164 is configured to couple to the frame (not shown) of the hull 120. The aerodynamic pivot joint 164 may be configured to resemble a short, stubby wing projecting from the hull.

Advantageously, the plurality of motors 160 are coupled to the hull 120 such that the HUAA vehicle 100 has a center of thrust that is disposed at about or above a center of aerodynamic pressure of the HUAA vehicle 100. By providing a center of thrust at about or above the center of aerodynamic pressure, a thrust force generated by the motors 160 will be optimally applied in the desired ordinate direction with maximum energy transfer. Further, this enables optimized and enhanced flight controls for the HUAA vehicle 100 as errors related to an offset of the center of thrust relative to the center of aerodynamic pressure are reduced or mitigated.

In the thrust configuration, each motor 162 is rotated so that each motor 162 generates approximately only a thrust force (e.g., such that air is exhausted approximately parallel to ground). In the lift configuration, each motor 162 is rotated so that each motor 162 generates approximately only a lift force (e.g., air is exhausted perpendicular to ground). Each motor 162 may be rotated between the thrust configuration and the lift configuration such that the motor produces both a lift force and a thrust force. Each motor 162 may be individually rotated so as to produce a desired flight direction or to stabilize the HUAA vehicle 100 when hovering.

For example, the motors 162a and 162c may be rotated into the thrust configuration to generate the thrust force and the motors 162b and 162d may be rotated into the lift configuration to generate the lift force. In another example, the motors 162a and 162b are rotated to a position between the thrust configuration and the lift configuration to generate both thrust and lift forces, and the motors 162c and 162d may be rotated to the thrust configuration to generate thrust forces. The plurality of motors 160 may be rotated forward or aft to produce forward or backward movement, respectively, of the HUAA vehicle 100.

The plurality of motors 160 may be rotated via a manual input and control system or via the controller 110 configured to automatically pilot the HUAA vehicle 100. The plurality of motors 160 may be rotated and operated so as to maneuver the HUAA vehicle 100 to increase or reduce altitude (e.g., by generating a negative lift force), increase or decrease speed, or maintain or change locations (e.g., to hover).

The plurality of motors may be powered via a gas generator, a hybrid electric system with electric motors, an augmented hybrid electric system, or alternative electric systems. The augmented hybrid electric system includes a hybrid gas generator and electric propulsions pods, solar panels integrated into the hull 120, and/or other alternative energy sources (e.g., chemical batteries or hydrogen fuel cells). The alternative electric systems may include a solar panel or solar cells integrated into the hull 120 and a backup battery to power the plurality of motors 160.

The HUAA vehicle 100 may include a plurality of fins 140. The fins 140 are coupled to a tail section 128 of the hull 120. In aspects, the plurality of fins 140 advantageously includes four fins 142a, 142b, 142c, and 142d arranged in an "X" about the tail section 128. Each fin (e.g., 142a, 142b, etc.) may include an actuatable rudder 144. The fins 140 are configured to provide directional control of the hull 120. The fins 140 are individually or collectively actuatable to control at least one of a yaw, a pitch, or a roll of the hull 120 of the HUAA vehicle 100. The fins 140 are configured to enable the HUAA vehicle 100 to respond to a wind direction and speed. The fins 140 are further configured to assist in rotating or maneuvering the HUAA vehicle 100 even in near-zero wind flight conditions. For example, the plurality of motors 160 may generate at least one of a thrust force or a lift force (which combines with the gas lift force) in near-zero wind flight conditions and the plurality of fins 140 may be actuated to cause the HUAA vehicle to turn, roll, or pitch or to reduce or minimize any undesired yaw, pitch, or roll. The plurality of fins 140 and the plurality of motors 160 advantageously enable the HUAA vehicle 100 to operate in winds about or greater than 25 miles per hour. The fins 140 also enable easier ground handling (e.g., transporting, docking, refueling/loading, maintenance, and launching procedures, etc.) of the HUAA vehicle 100.

The plurality of fins 140 may further be configured to generate aerodynamic lift when wind is present. In some aspects, when the fins 140 generate aerodynamic lift, the plurality of motors may be operated to supplement the aerodynamic lift when wind speeds are low or zero such that the plurality of fins 140 are not generating sufficient aerodynamic lift for a desired altitude or mission profile.

Figure 5:
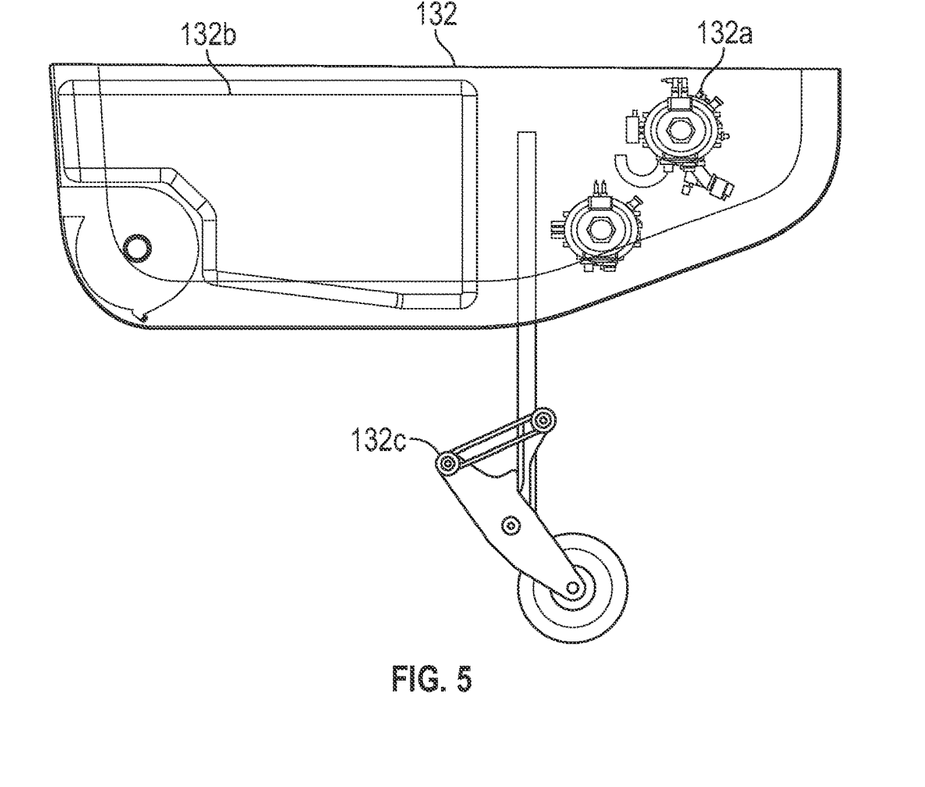
FIG. 5 is a side view of a gondola of the unmanned hybrid airship-aerostat of FIG. 1.
Figure 6:
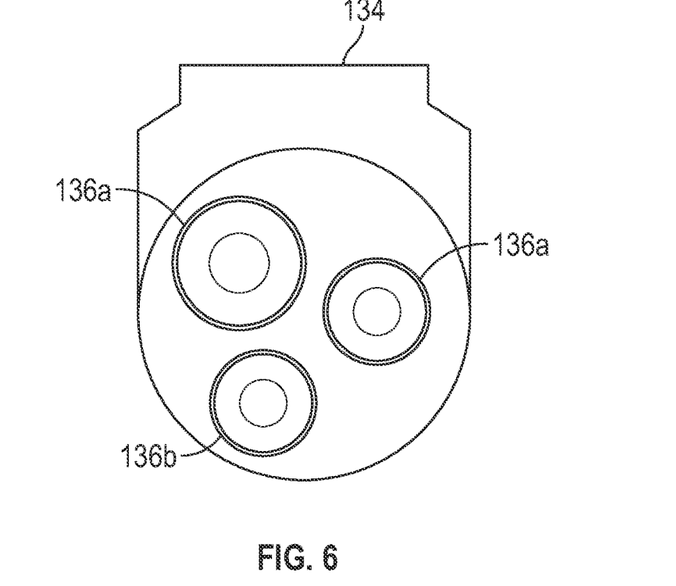
FIG. 6 illustrates a surveillance system of the unmanned hybrid airship-aerostat of FIG. 1.

With additional reference to FIGS. 5 and 6, the payload 130 may be coupled to the hull 120 at any suitable location. The gondola 132 is removable coupled to an underside of the hull 120. The gondola 132 may include at least one of a generator 132a, a tank 132b configured to contain a fuel, a battery (not shown), or a landing gear 132c. In aspects, the gondola 132 may include tactical equipment (not shown) including, for example, thermal vision sensors, imaging sensors, barometers, or the like munitions. In other aspects, the controller 110 may be disposed in the gondola 132. The gondola 132 is coupled to the hull 120 when the HUAA vehicle 100 is in the airship configuration and the gondola 132 is removed from the hull 120 when the HUAA vehicle 100 is in the aerostat configuration.

The generator 132a may consume fuel contained in the tank 132b to produce electricity to power one or more motors 162 of the plurality of motors 160. In aspects, the generator 132a is a hydrogen fuel cell configured to generate electricity.

The surveillance system 134 includes one or more cameras 136a configured to obtain an image or video or a radar detector 136b configured to detect an aerial object (e.g., another HUAA vehicle 100, a plane, a drone, a missile, etc.), a proximity sensor (not shown), a light detection and ranging (LIDAR) sensor (not shown), or a global positioning system sensor (not shown), or other detection sensors (e.g., thermal sensors or SONAR sensors (not shown)). The surveillance system 134 may be configured couple to a television or other broadcast system. The surveillance system 134 is configured to wirelessly transmit captured images, videos, or other data collected by the surveillance system 134 to a remote server, database, or computing device. The surveillance system 134 may wirelessly transmit the captured images, videos, or other data collected by the surveillance system 134 via the network interface 118 of the controller 110 or another controller. In aspects, images, videos, or other data may be transmitted via a wired connection coupled to the surveillance system 134. In aspects, the surveillance system 134 may be rotatable about a mount coupled to the hull 120. In aspects, the surveillance system 134 may be coupled to a forward or aft portion of the hull 120. The HUAA vehicle 100 may include a plurality of surveillance systems 134. The surveillance system 134 may be powered by the generator of the gondola 132 or via the tether coupled to the hull 120 when the HUAA vehicle 100 is in the aerostat configuration.

Figure 7:
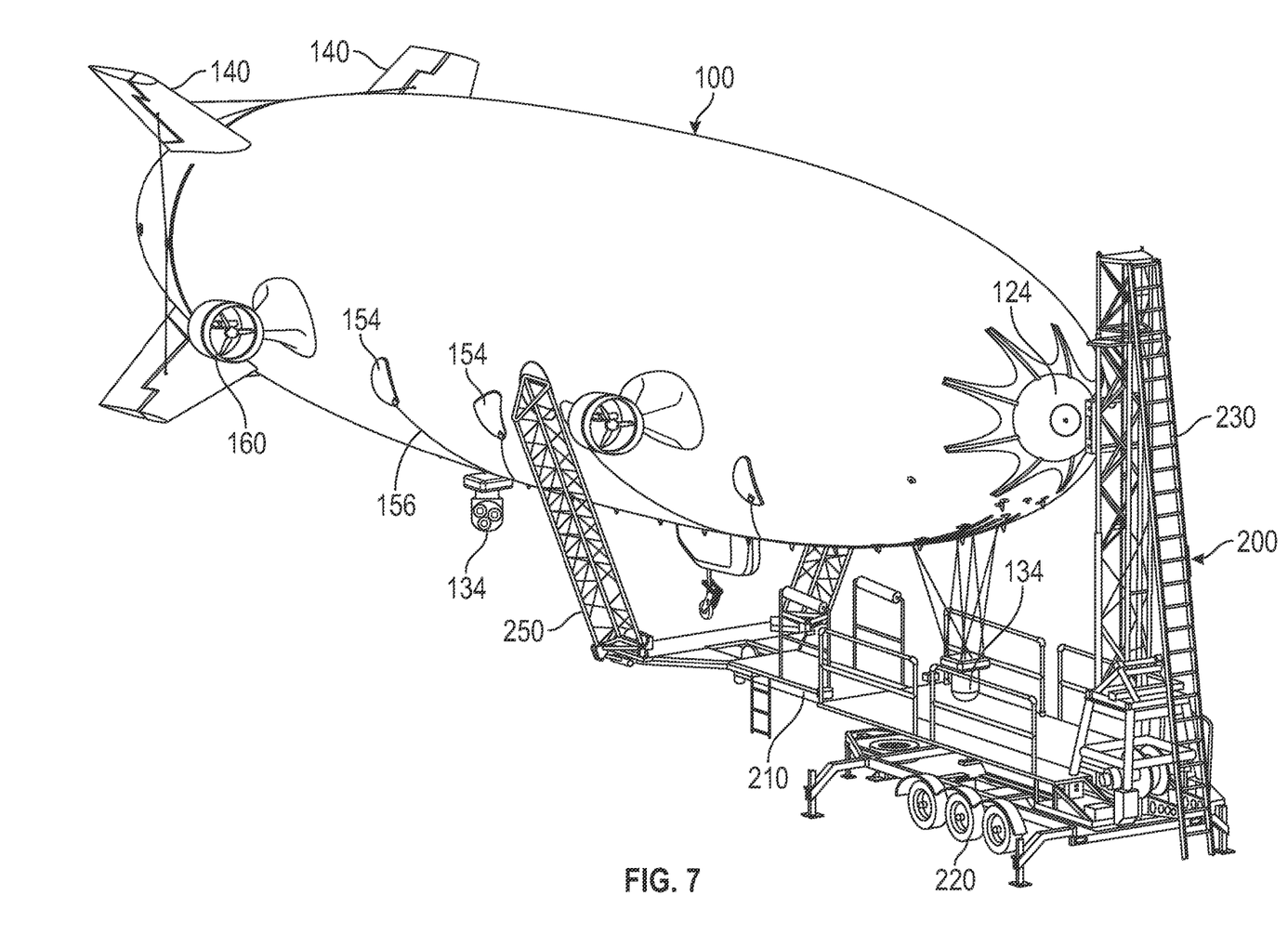
FIG. 7 is a perspective of the unmanned hybrid airship-aerostat of FIG. 1 docked in a mooring platform.
Figure 8:
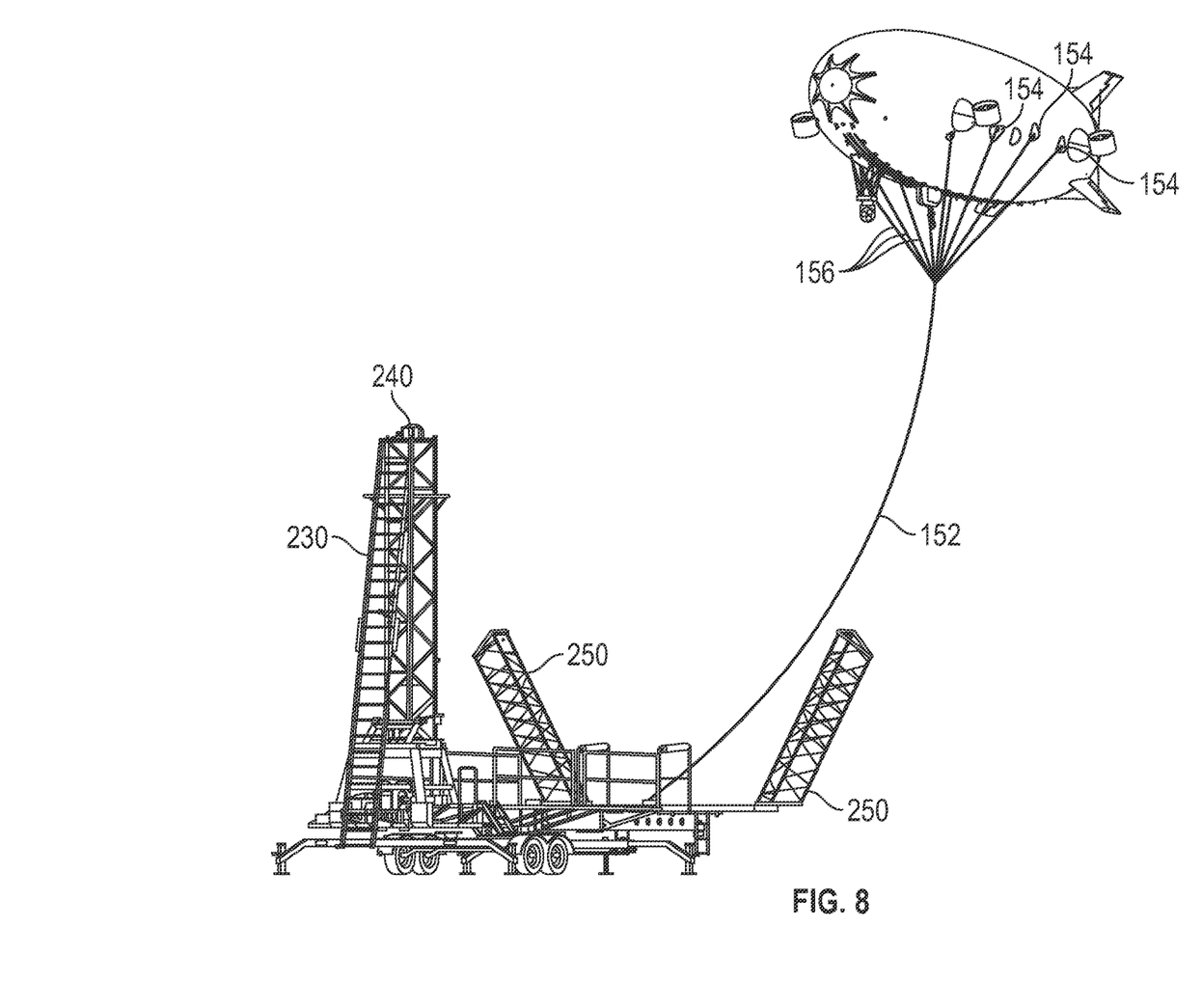
FIG. 8 is a perspective view of the unmanned hybrid airship-aerostat of FIG. 1 tethered to the mooring platform of FIG. 7.

With reference to FIGS. 7 and 8, the HUAA vehicle 100 includes a bridle system 150 coupled to the hull 120 that enables the HUAA vehicle to be removably coupled to a tether 152 at a first end of the tether 152. The bridle system 150 includes one or more line patches 154. Each line patch 154 may include a line 156 configured to couple to the first end of the tether 152. When one of the lines 156 is not coupled to the tether, the line 156 is coupled to a line anchor 158 (FIG. 1) disposed on the hull 120 such that the lines 156 are secured against the hull 120. In aspects, a plurality of line anchors 158 may be coupled to the hull 120 and configured to received mooring lines (not shown) when the HUAA vehicle 100 is docked at the mooring platform 200 or otherwise docked or secured to another docking structure or land (e.g., when moored in a field without a mooring platform 200).

The tether 152 is configured to be removably coupled to the HUAA vehicle 100 and the mooring platform 200. When the HUAA vehicle 100 is in the aerostat configuration the bridle system 150 is coupled with the tether 152 and when the HUAA vehicle 100 is in the airship configuration the bridle system 150 is not coupled to the tether 152. When the HUAA vehicle 100 is in the aerostat configuration, and is thus coupled to the tether 152, the tether 152 provides electrical power to the HUAA vehicle 100. The tether 152 may provide power to the surveillance system 134, the gondola 132, the plurality of motors 160, the plurality of fins 140, the controller 110, or any other component of the HUAA vehicle 100 requiring electrical power. The tether 152 may be coupled to a ground generator (not shown) disposed on or adjacent to the mooring platform 200 or to another source of electricity (e.g., a power grid) at a second end of the tether 152. In aspects, the bridle system 150 may facilitate wired communication, via the tether 152, to the controller 110 or other computing device. In aspects, the tether 152 may include fiber optics cable to enable the HUAA vehicle 100 to communicate with the controller 110 or other computing device when in the HUAA vehicle 100 is in the aerostat configuration. In other aspects, the tether 152 provides only power to the HUAA vehicle 100, and, advantageously, the HUAA vehicle 100 is in wireless communication with the controller 110 or other computing device to enable the HUAA vehicle 100 to seamlessly transition between the aerostat configuration and the airship configuration. In some aspects, when the HUAA vehicle 100 is in the aerostat configuration, the plurality of motors 160 may be removed (and removably coupled) so as to reduce the weight of the HUAA vehicle 100

The tether 152 may be stored in a winch (not shown) disposed on the mooring platform 200. The tether 152 may be automatically (e.g., robotically) coupled to the hull 120 or may be manually coupled to the hull 120 by a ground crew. The tether 152 may be between 100 feet and 5,000 feet in length or between about 250 feet to about 2,500 feet in length to enable the HUAA vehicle 100 to operate to hover or "kite" in the aerostat configuration anywhere up to about 5,000 feet or about 2,500 feet above ground level from the mooring platform 200.

Figure 9:
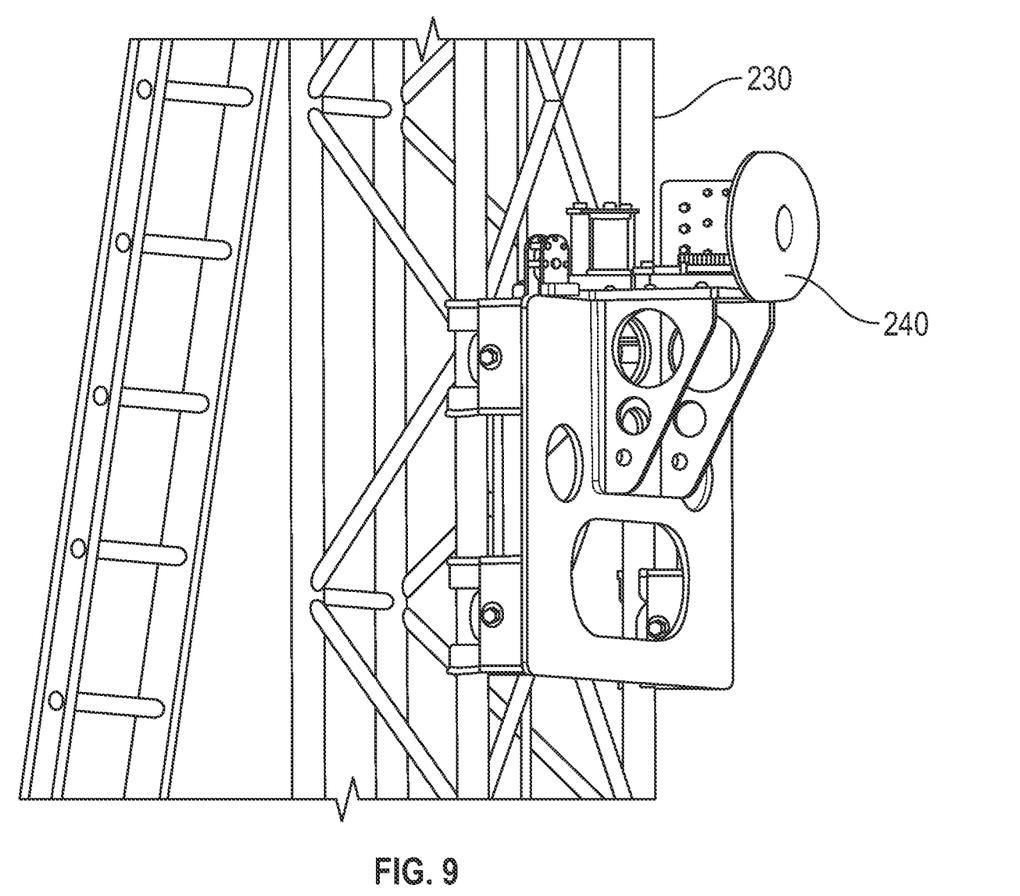
FIG. 9 is a detailed view of a receiving cone of the mooring platform of FIG. 1.

With additional reference to FIG. 9, the mooring platform 200 is configured to receive the HUAA vehicle 100 to enable the HUAA vehicle 100 to dock. The mooring platform 200 includes a bed 210 pivotably coupled to a trailer 220, a tower 230 coupled to the bed 210, a receiving cone 240 coupled to the tower 230, and a pair of retaining arms 250 also coupled to the bed 210. The receiving cone 240 is configured to receive the nose 124 of the hull 120 of the HUAA vehicle 100 and is configured to slide along the tower. The receiving cone 240 slides along the tower 230 to lower the HUAA vehicle 100, for example, when, after the HUAA vehicle 100 is received by the receiving cone 240, the HUAA vehicle 100 is lowered toward the bed 210 of the mooring platform 200.

The retaining arms 250 are configured to transition between an open configuration and a grasping configuration. When the retaining arms 250 are in the grasping configuration, the retaining arms grasp or secure a middle section of the hull 120 of the HUAA vehicle 100. The retaining arms 250 may be automatically transitioned between the open configuration and the grasping configuration and vice-versa by the controller 110 when the HUAA vehicle 100 is docking or launching, respectively.

The HUAA vehicle 100 may be transitioned (manually or robotically) between the aerostat configuration and the airship configuration while docked or moored at the mooring platform 200. While the HUAA vehicle 100 is docked at the mooring platform 200, the payload 130 and the tether 152 may be removed or coupled to the hull 120 to transition the HUAA vehicle 100 between the aerostat configuration and the airship configuration. The mooring platform 200 may include lights and LEDs, or vision markers, that may signal the HUAA vehicle 100 is docking, launching, landed, secured, or transitioning between the airship configuration and the aerostat configuration.

Figure 10:
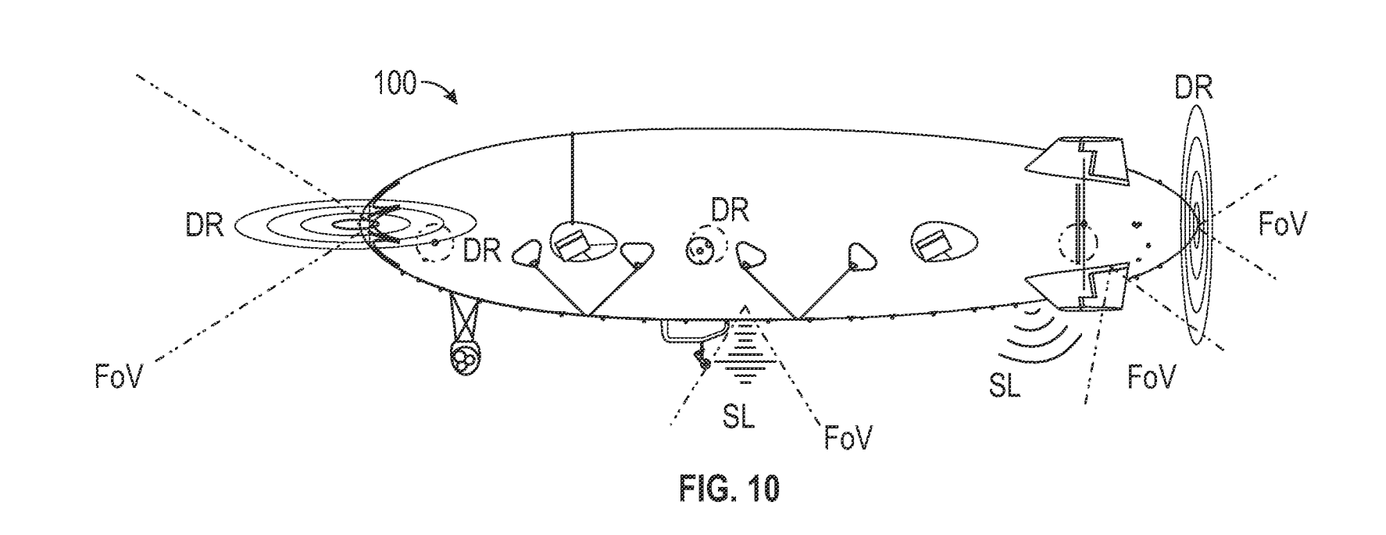
FIG. 10 is a diagram of the hybrid airship-aerostat of FIG. 1 sensing its surroundings.
Figure 11:
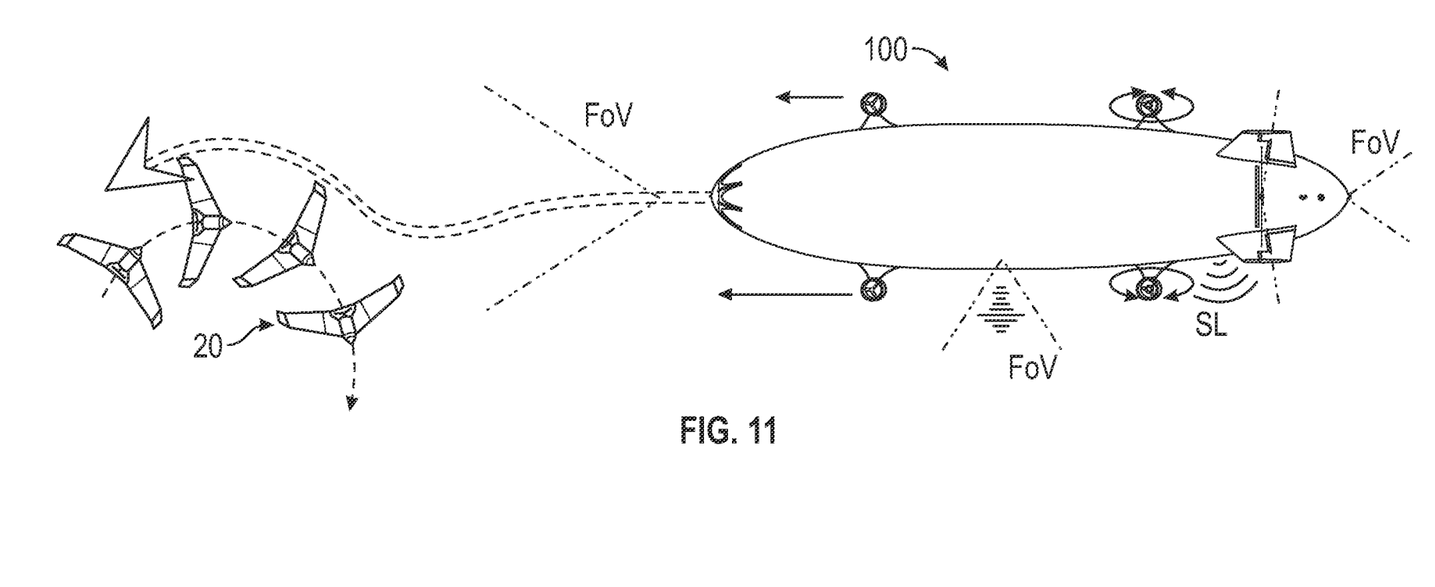
FIG. 11 is a diagram of the hybrid airship-aerostat of FIG. 1 detecting an aerial object to avoid.

With reference to FIGS. 10 and 11, the controller 1120 of the HUAA vehicle 100 is configured to automatically pilot itself based on data collected from the surveillance system 134 or other sensors. The HUAA vehicle 100 may have a plurality of sensors configured to collect the data, the data including a location, a speed, or a direction of an aerial object, a location, a speed, or a direction of a ground object, a geographic topography, a flight parameter, a meteorological condition, or the like. The plurality of sensors may include at least one of a camara, a radar, a scanning LiDAR ("SL"), or a doppler radar ("DR"). The flight parameter may be a position, an orientation, an altitude, a velocity, or any combination thereof of the HUAA vehicle 100. The meteorological condition may be a wind speed, a wind direction, a temperature, density, or pressure of air, an inclement weather condition (e.g., lightning storm, tornado, dust storm, turbulent wind, etc.), a cloud cover condition, or any combination thereof.

The controller 110 is configured to operate the plurality of motors 160 and the plurality of fins 140 based on the data collected. For example, the surveillance system 134 may detect an aerial object 20 and its speed, direction, and location, and the controller 110 rotates at least one of the motors 162a, 162b, 162c, or 162d and one of the fins of the plurality of fins 140 to maneuver the HUAA vehicle 100 around the aerial object 20 as shown in FIG. 11. FIG. 11 illustrates a flight path determined by the controller 110 that would cause the HUAA vehicle 100 to avoid the aerial object 20 (e.g., a drone, a helicopter, a plane, another HUAA vehicle 100, or a stationary object such as a tower, mountain, or tree that is in air space surrounding the HUAA vehicle 100). FIGS. 10 and 11 further illustrate an example of a variety of fields of view ("FoV") and sensor or detection ranges of the surveillance system 134 or of a plurality of sensors distributed about the hull 120. The HUAA vehicle 100 may be equipped with sufficient sensors to produce a 360 degree FoV about the HUAA vehicle 100.

In aspects, the controller 110 may operate one or more ballonets to control a pressure of the hull 120 of the HUAA vehicle 100 and thereby change an angle of attack of the HUAA vehicle 100 to ascend or descend. The HUAA vehicle 100 may include a forward ballonet and an aft ballonet and the controller 110 may inflate or deflate at least one of the forward or aft ballonets to change the angle of attack of the HUAA vehicle 100. The HUAA vehicle 100 may include a lighter than air gas pumping system disposed in the hull 120 or the gondola 132 to pump additional lighter-than-air gas to or remove lighter-than-air gas from the hull 120 to change a buoyancy of the HUAA 100. In aspects, the lifting gas pumping system is configured to add or remove the lighter-than-air gas to change a positive or negative buoyancy of the HUAA 100.

The controller 110 may include at least one of track specific (TS) guidance algorithms or proportional navigation (PN) guidance algorithms. The TS guidance algorithms are configured to navigate the HUAA vehicle 100 based on a pre-determined track or flight plan. The TS guidance algorithms include an Extended Kalman Filter (EKF) configured to estimate at least one of a wind condition, other meteorological conditions, or a flight parameter. The EKF may include scheduling pre-calculated Jacobians that reduce the computational effort of the processor 112 of the controller 110. The TS guidance algorithms may be implemented in a linear-quadratic regulator (LQR). PN guidance algorithms are configured to navigate the HUAA vehicle 100 based on a change to a line of sight of the HUAA vehicle 100. In the PN guidance algorithm, a velocity vector of the HUAA vehicle 100 is controlled to rotate at a rate proportional to a rate of rotation of the line of sight of the HUAA vehicle 100. Advantageously, the PN navigation algorithm is configured to operate the plurality of motors 160 and the plurality of fins 140 based on the flight parameter or the meteorological condition.

The controller 110 may include a collision avoidance algorithm based on a collision cone. The collision cone is an area define by a cone having an apex on the hull 120 of the HUAA vehicle 100 and the area covers an aerial object. When a velocity vector of the HUAA vehicle 100 lies inside a collision cone, then the controller 110 operates at least one of the plurality of motors 160 or the plurality of fins 140 to move the velocity vector outside of the collision cone.

The controller 110 may include artificial intelligence algorithms to automatically pilot the HUAA vehicle 100 based on the data collected by the surveillance system 134 or plurality of sensors distributed about the hull. The controller 110 may include machine learning algorithm, artificial neural network, convolutional neural network (CNN) algorithms, shift neural network algorithm, machine vision algorithms, and the like configured to enable the controller 110 to pilot the HUAA vehicle 100. In aspects, the controller 110 is further configured to automatically dock the HUAA vehicle 100, launch or land the HUAA vehicle 100, perform a predetermined mission (e.g., a reconnaissance mission), or generally pilot the HUAA vehicle 100 within or to a designated area. The controller 110 may be programmed to return the HUAA vehicle 100 to the mooring platform 200 or other predetermined site if, for example, the HUAA vehicle 100 loses a predetermined amount of the lighter-than-air gas, the HUAA vehicle 100 has sustained a predetermined amount of damage, to avoid inclement weather, or to refuel, power up, or to transition the HUAA vehicle 100 between the aerostat configuration and the airship configuration. The controller 110 may be configured to autonomously stabilize the HUAA vehicle 100 in response to the meteorological condition or damage conditions (e.g., a broken motor or hole in the hull 120).

The controller 110 is further configured to pilot the HUAA vehicle 100 in the aerostat configuration and the airship configuration. When the HUAA vehicle 100 is in the aerostat configuration, the controller 110 is configured to maintain the HUAA vehicle 100 within a predetermined kiting maneuver such that the tether 152 does not break or become disconnected. For example, if the tether 152 is 500 feet, and wind conditions cause the tether 152 to have a parabolic shape, the controller 110 maintains the HUAA vehicle 100 at a sufficient altitude and proximity to the mooring platform such that the tether 152 does not experience overloading or too much tension.

When the HUAA vehicle 100 is in the airship configuration, the controller 110 may receive manual inputs to pilot the hull 120 or may automatically pilot the hull 120 without constraints of the tether 152 and pilot the hull 120 based on a predetermined mission profile (e.g., surveying farmland, inspecting power transmission lines or gas pipelines, tactical reconnaissance, etc.). The controller 110 may be configured to estimate the range and orientation of the HUAA vehicle 100 relative to the mooring platform 200.

The controller 110 may be configured to automatically pilot the HUAA vehicle 100 if the HUAA vehicle 100 loses wireless connection with a ground pilot or ground controller, or if the HUAA vehicle is beyond a line of sight of a ground pilot. The controller 110 may communicate with a ground computing system (not shown) such that a ground pilot can control the HUAA vehicle 100 from the ground computing system, receive video or image broadcasts from the surveillance system 134, or otherwise receive data from the HUAA vehicle 100.

Figure 12:
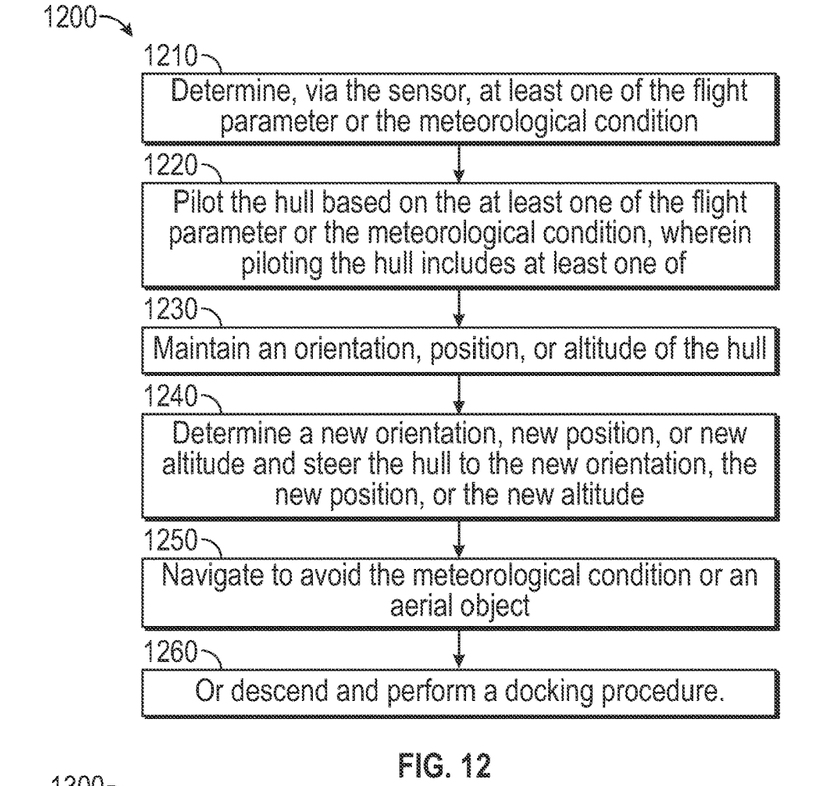
FIG. 12 is a diagram of a method for automatically piloting a hybrid unmanned airship-aerostat.
Figure 13:
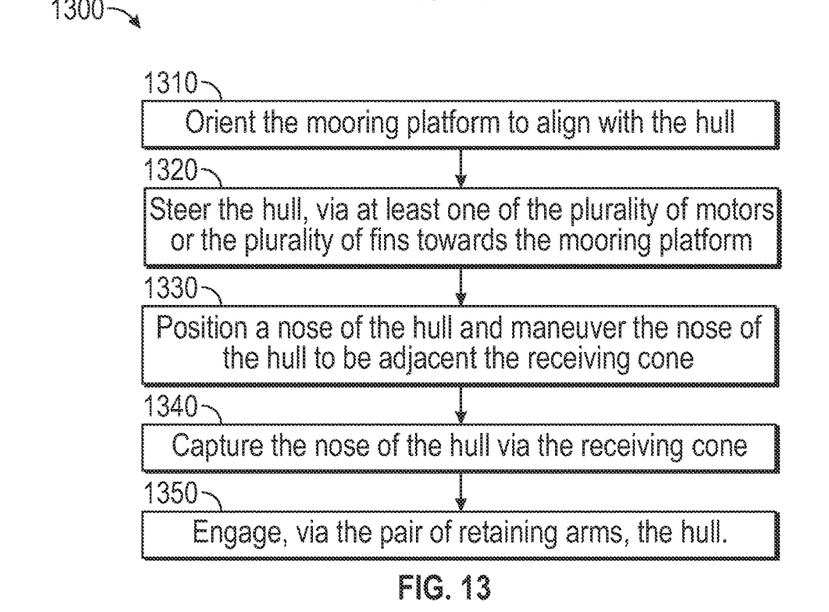
FIG. 13 is a diagram of a method for automatically docking a hybrid unmanned airship-aerostat in a mooring platform.

With reference to FIGS. 12 and 13, there are shown flow charts of exemplary computer implemented methods 1200 and 1300 for automatically piloting an HUAA vehicle 100 in accordance with aspects of this disclosure. Although the steps of FIGS. 12 and 13 are shown in a particular order, the steps need not all be performed in the specified order, and certain steps can be performed in another order. Additionally, where it is indicated that at least one step is performed, one or more of the indicated steps may be eliminated. For simplicity, FIGS. 12 and 13 will be described below with the controller 110 performing the operations. However, in various aspects, the operations of FIGS. 12 and 13 may be performed in part by the controller 110 of FIG. 3 and in part by another device, such as a remote server. These variations are contemplated to be within the scope of the present disclosure.

With reference to FIG. 12, operation 1210 of method 1200 includes the controller 110 determining, via a sensor, at least one of the flight parameter or the meteorological condition. At operation 1220, the controller 110 pilots the hull 120 based on the at least one of the flight parameter or meteorological condition. The controller 110 pilots the hull by operating at least one of the plurality of motors 160 or the plurality of fins 140 during operations 1230, 1240, 1250, or 1260. At operation 1230, the controller 110 maintains an orientation, a position, or an altitude of the HUAA vehicle 100. At operation 1240, the controller 110 determines at least one of a new orientation, a new position, or a new altitude and steers the HUAA vehicle 100 to the new orientation, the new position, or the new altitude. At operation 1250, the controller 110 navigates the HUAA vehicle 100 to avoid the meteorological condition or the aerial object. At operation 1260, the controller 110 pilots the HUAA vehicle to descend and perform a docking procedure.

FIG. 13 illustrates a method 1300 for automatically piloting and docking the HUAA vehicle 100. At step 1310, the controller 110 orients the mooring platform 200 to align with the hull (or vice versa). At operation 1320, the controller 110 steers the hull 120 of the HUAA vehicle, via at least one of the plurality of fins 140 or plurality of motors 160, towards the mooring platform 200. At operation 1330, the controller 110 positions the nose 124 of the hull 120 and maneuvers the nose 124 of the hull 120 to be adjacent the receiving cone 240 of the mooring platform 200. At operation 1340, the controller 110 causes the mooring platform 200 to capture the nose 124 of the HUAA vehicle 100 via the receiving cone 240. At operation 1350, the controller 110 causes the mooring platform to engage the hull 120 via the pair of retaining arms 250. In aspects, method 1300 includes automatically coupling or removing to or from, respectively, the HUAA vehicle 100 at least one of the payload 130 or the tether 152. In aspects, operations 1340 and 1350 may be reverse in a takeoff procedure of the HUAA vehicle 100.

The phrases "in an aspect," "in aspects," "in various aspects," "in some aspects," or "in other aspects" may each refer to one or more of the same or different aspects in accordance with this disclosure. A phrase in the form "A or B" means "(A), (B), or (A and B)." A phrase in the form "at least one of A, B, or C" means "(A); (B); (C); (A and B); (A and C); (B and C); or (A, B, and C)."

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Persons skilled in the art will understand that the structures and methods specifically described herein and shown in the accompanying figures are non-limiting exemplary aspects, and that the description, disclosure, and figures should be construed merely as exemplary of aspects. It is to be understood, therefore, that this disclosure is not limited to the precise aspects described, and that various other changes and modifications may be effectuated by one skilled in the art without departing from the scope or spirit of the disclosure. Additionally, the elements and features shown or described in connection with certain aspects may be combined with the elements and features of certain other aspects without departing from the scope of this disclosure, and that such modifications and variations are also included within the scope of this disclosure. Accordingly, the subject matter of this disclosure is not limited by what has been particularly shown and described.

What is claimed is:

1. A hybrid airship-aerostat comprising:
   a hull;
   a motor coupled to the hull configured to rotate between a thrust configuration and a lift configuration, the motor configured to generate a lift force, a thrust force, or a combination thereof;
   a fin coupled to a tail of the hull, the fin configured to provide directional control of the hull;
   a controller configured to operate the motor and the fin to pilot the hull;
   a bridle system configured to removably couple to a first end of a tether; and
   a mooring platform, the mooring platform comprising a pair of retaining arms configured to pivot between an open position and a grasping position, the pair of retaining arms configured to engage the hull in the grasping position.

2. The hybrid airship-aerostat of claim 1, further comprising a gondola removably coupled to the hull.

3. The hybrid airship-aerostat of claim 1, wherein the controller is configured to operate the motor and the fin to pilot the hull towards a mooring platform, the mooring platform coupled to a second end of the tether.

4. The hybrid airship-aerostat of claim 1, further including at least one ballonet and a lighter-than-air gas pumping system;
   wherein the controller is configured to inflate or deflate the ballonet to adjust an angle of attack of the hull; and
   wherein the lighter-than-air gas pumping system is configured to add or remove a lighter-than-air gas to the hull to change a buoyancy of the hull.

5. The hybrid airship-aerostat of claim 1, further comprising a surveillance system removably coupled to the hull.

6. The hybrid airship-aerostat of claim 5, wherein the surveillance system includes at least one of a camera or a radar.

7. The hybrid airship-aerostat of claim 1, wherein the controller is configured to operate the fin to control at least one of a yaw, a pitch, or a roll of the hull; and
   the controller is configured to cause the motor to rotate between the thrust configuration and the lift configuration and cause the motor to generate the lift force, the thrust force, or any combination thereof.

8. The hybrid airship-aerostat of claim 7, wherein the motor is operable in an intermediate position wherein the motor generates both the lift force and the thrust force.

9. The hybrid airship-aerostat of claim 1, wherein the hull is transitionable between an airship configuration and an aerostat configuration, such that, when the bridle system is not coupled to the tether the hull is in the airship configuration and when the bridle system is coupled to the tether the hull is in the aerostat configuration.

10. The hybrid airship-aerostat of claim 9, further comprising a sensor configured to determine at least one of a flight parameter or a meteorological condition, the sensor in wired communication or wireless communication with the controller.

11. The hybrid airship-aerostat of claim 10, wherein the controller is configured to operate the motor and the fin to pilot the hull based on the flight parameter or meteorological condition determined by the sensor.

12. A lighter-than-air vehicle transitionable between an aerostat configuration and an airship configuration comprising:
    a hull including:
       a plurality of fins extending from an aft portion of the hull, each fin actuatable to control at least one of a yaw, a pitch, or a roll of the hull;
       a plurality of motors having a first motor and a second motor, the first motor rotatably coupled to a first side of the hull, the second motor rotatably coupled to a second side of the hull;
    a sensor configured to determine at least one of a flight parameter or a meteorological condition;
    a controller configured to operate the plurality of motors and actuate the plurality of fins based on the at least one of the flight parameter or the meteorological condition;
    a tether removably coupled to the hull at a first end of the tether, the tether configured to provide electrical power to at least one of the plurality of motors, the sensor, or the plurality of fins; and
    a mooring platform, the mooring platform comprising a pair of retaining arms configured to pivot between an open position and a grasping position, the pair of retaining arms configured to engage the hull in the grasping position.

13. The lighter-than-air vehicle of claim 12, a surveillance system coupled to the hull, the surveillance system configured to obtain at least one of an image, a video, a direction and a location of an aerial object, or any combination thereof.

14. The lighter-than-air vehicle of claim 12, wherein, when the lighter-than-air vehicle is in the aerostat configuration, the tether is coupled to the hull, and when the lighter-than-air vehicle is in the airship configuration the tether is not coupled to the hull.

15. The lighter-than-air vehicle of claim 12, wherein the controller includes a processor and a memory having instructions stored thereon, the instructions which, when executed by the processor, cause the lighter-than-air vehicle to:
    determine, via the sensor, at least one of the flight parameter or the meteorological condition;
    pilot the hull based on the at least one of the flight parameter or the meteorological condition, wherein piloting the hull includes at least one of:
       maintain an orientation, position, or altitude of the hull;
       determine a new orientation, new position, or new altitude and steer the hull to the new orientation, the new position, or the new altitude;
       navigate to avoid the meteorological condition or an aerial object; or
       descend and perform a docking procedure.

16. The lighter-than-air vehicle of claim 12, wherein the flight parameter includes at least one of a position, an orientation, an altitude, a velocity, or any combination thereof of the hull; and
    wherein the meteorological condition includes at least one of: a wind speed, a wind direction, a density of air, an inclement weather condition, a cloud cover condition, or an air pressure.

17. The lighter-than-air vehicle of claim 12, wherein the plurality of motors includes a third motor and a fourth motor, and the plurality of fins includes four fins arranged in an "X" configuration about the hull,
    wherein the controller is configured to control each motor to cause the hull to ascend, descend, or maintain an altitudinal position, move forward or rearward, turn, or any combination thereof, and wherein the controller is configured to actuate each fin to control at least one of a yaw, a pitch, or a roll of the hull.

18. The lighter-than-air vehicle of claim 12, wherein, when in the airship configuration, the hull includes a gondola; and wherein, when in the aerostat configuration, the tether is coupled to a bridle system of the hull.

19. The lighter-than-air vehicle of claim 12, wherein the mooring platform is coupled to a second end of the tether, the mooring platform configured to receive the hull, the mooring platform further including:
 a bed pivotably coupled to a trailer;
 a tower coupled to the bed; and
 a receiving cone configured to slide along the tower and configured to receive a nose of the hull.

20. The lighter-than-air vehicle of claim 19, wherein the controller includes a processor and a memory with instructions stored thereon, the instructions which, when executed by the processor, are configured to cause the hull to:
 orient the mooring platform to align with the hull;
 steer the hull, via at least one of the plurality of motors or the plurality of fins towards the mooring platform;
 position a nose of the hull and maneuver the nose of the hull to be adjacent the receiving cone;
 capture the nose of the hull via the receiving cone; and
 engage, via the pair of retaining arms, the hull.

\* \* \* \* \*